United States Patent
Widemann

(10) Patent No.: US 9,050,959 B2
(45) Date of Patent: Jun. 9, 2015

(54) AXIAL COUPLING WITH COMPENSATED FORCES

(75) Inventor: Axel Widemann, Neumunster (DE)

(73) Assignee: Danfoss Power Solutions Inc., Ames, IA (US)

(*) Notice: Subject to any disclaimer, the term of this patent is extended or adjusted under 35 U.S.C. 154(b) by 719 days.

(21) Appl. No.: 13/325,122

(22) Filed: Dec. 14, 2011

(65) Prior Publication Data

US 2012/0148385 A1 Jun. 14, 2012

(30) Foreign Application Priority Data

Dec. 14, 2010 (DE) .......................... 10 2010 063 084

(51) Int. Cl.
*F16D 13/76* (2006.01)
*B60T 13/20* (2006.01)
*B60T 8/36* (2006.01)

(52) U.S. Cl.
CPC *B60T 13/20* (2013.01); *B60T 8/368* (2013.01)

(58) Field of Classification Search
CPC ....... F16D 13/24; F16D 13/76; F16D 25/063; F16D 25/0632

USPC .................................................... 60/435, 436
See application file for complete search history.

(56) References Cited

U.S. PATENT DOCUMENTS 2,147,334 A * 2/1939 De Boysson ................. 417/223
4,813,234 A * 3/1989 Nikolaus ...................... 60/484

\* cited by examiner

*Primary Examiner* — F. Daniel Lopez
(74) *Attorney, Agent, or Firm* — Zarley Law Firm, P.L.C.

(57) ABSTRACT

The invention relates to a drive train (1) for a hydraulic drive where a friction coupling (3) is arranged between a hydraulic machine (2) and a consumer (5). The coupling (3) has two parts (20A, 20B) which are displaceable towards each other in the axial direction (18) and are connected to the hydraulic machine (2) or to the consumer (5). Hydraulic fluid is introduced by means of a pressure line (28) into a pressure chamber (27) formed between the parts (20A, 20B), as a result of which the complementarily formed friction surfaces (9A, 9B) become frictionally locked together and a torque is able to be transmitted between the hydraulic machine (2) and the consumer (5). The friction surfaces (9A, 9B) are each fixedly connected at least radially to the shaft of the hydraulic machine (2) or of the consumer (5).

7 Claims, 3 Drawing Sheets

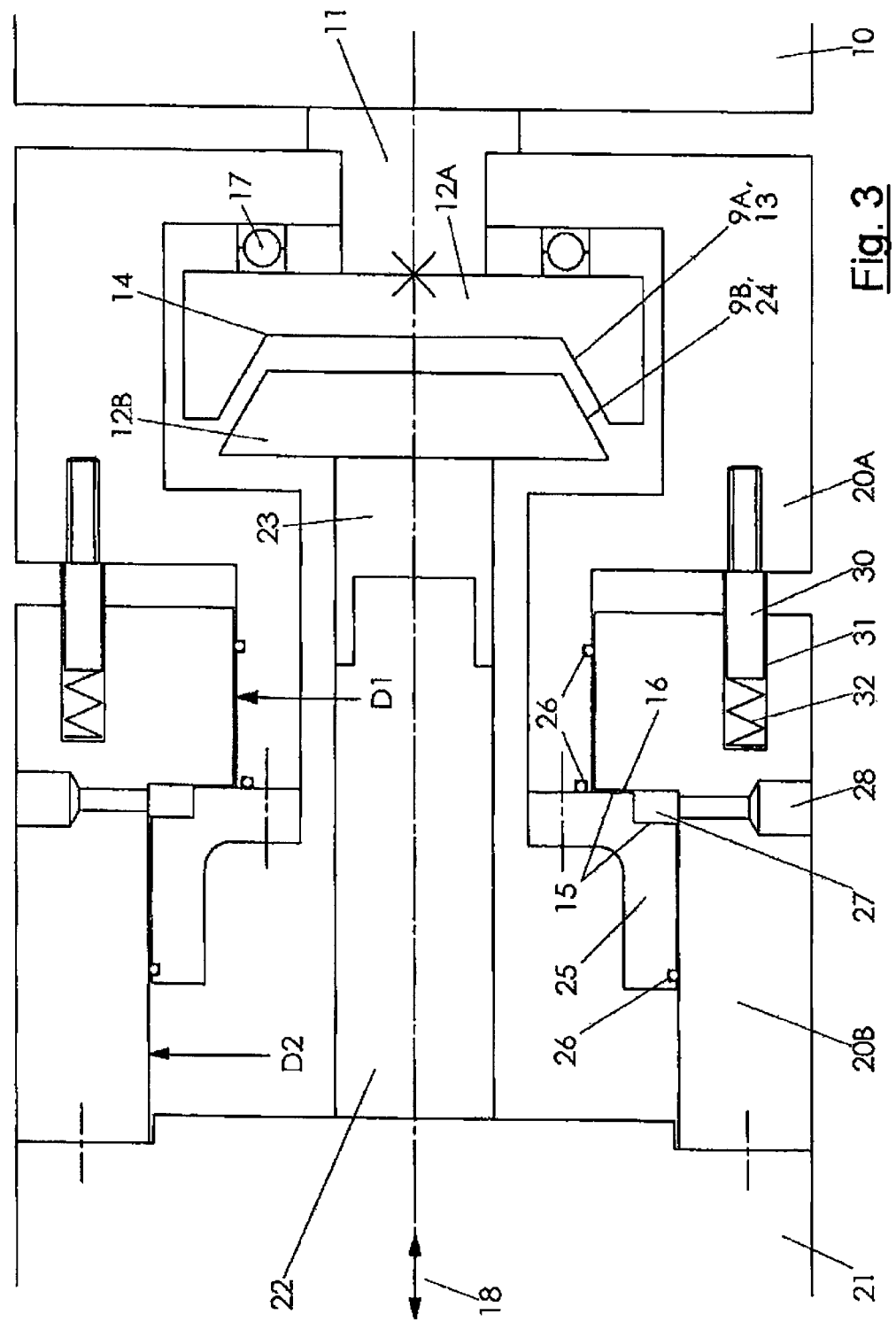

AXIAL COUPLING WITH COMPENSATED FORCES

BACKGROUND OF THE INVENTION

The invention relates to a drive train of a hydraulic drive according to the preamble of Claim 1.

Drive trains of the generic type are often used in hydraulically driven, driveable operating machines, such as are known, for example, from DE 44 31 864 A1. In the case of such high-performance drives, the requirement is to reach high travelling speeds as well as a high level of tractive force with high levels of efficiency. Drives with two hydro-machines are increasingly being used for this purpose nowadays, both of which, as a rule, are adjustable. Examples for this are provided by DE 195 10 914 A1 and DE 43 07 616.

In this case, both hydro-motors are driven by a common hydro-pump and, as regards the circuit of the hydraulic fluid, are connected in parallel. The one hydro-motor can be adjusted to zero displacement to achieve a high travelling speed. This hydro-motor is then disengaged to avoid high flange losses, i.e. it goes to zero r.p.m. So that the driving power of said hydro-motor can be utilized again, it has to be engaged in the associated drive train by means of a coupling. If both hydro-motors are engaged at maximum displacement, the highest tractive force of the vehicle is thus available.

A disadvantage of the known drive train of the described type is that when the hydraulic machine or the hydro-motor is reconnected in the above-mentioned prior art and as a result the drive train is engaged, on account of the conventionally used synchronous couplings the hydraulic machine has first to be accelerated in order to reach the necessary synchronous speed for the coupling engagement. In this case, there is dependence on the operating pressure of the hydraulic drive and on the required speed, which makes control expensive and requires a considerable sensor system. This applies in an analogous manner to claw couplings.

When using synchronous couplings, the hydraulic machine must initially be brought to the speed of the transmission drive shaft, so that engagement, in particular in the case of claw couplings, is possible. When starting/running up to speed or accelerating, the displacement of an adjustable hydraulic machine can only be selected just so high that, prior to engagement, the necessary speed is not exceeded on the still load-free hydraulic machine. I.e. the displacement and consequently the torque of the load-free hydraulic machine at this point is precisely as high as is required by the inertia and/or friction of the hydraulic machine. If the displacement of the hydraulic machine, which is to be integrated in the drive train by way of a synchronous coupling, were to be adjusted, still in the load-free state, to the torque to be output/taken on, the speed set for the hydraulic machine in relation to the transmission or a consumer would be too high for the synchronous engagement. For fixed displacement machines with constant displacement, the speed control must be regulated by way of the hydraulic pressure and hydraulic fluid flow present in the motor.

If the load-free hydro-machine, to be synchronously engaged, has reached the speed of the consumer or transmission through corresponding adjustment of the displacement/pressure, engagement is able to take place, the torque output or to be taken on by the hydraulic machine in by far the majority of cases not corresponding to the expected power level of the hydraulic machine and the speed having to be readjusted commensurate with the torque. However, this cannot take place until after engagement, so that the speed of the hydraulic machine does not increase beyond that of the consumer or come to a standstill if the torque set is insufficient. Over and above this, the expensive and complicated control requires the engagement operation to be coordinated in time, said engagement operation not then always taking place smoothly in a manner that protects the materials. In a corresponding manner, this is often monitored by a complicated system of sensors.

SUMMARY OF THE INVENTION

The object underlying the invention is to provide a drive train of a hydraulic drive of a driveable operating machine, which drive train is constructed in a simpler manner than known systems and which requires reduced expenditure on control for coupling operations when connecting or disconnecting hydraulic machines to or from the drive train. In addition, the drive train is to be developed in a sturdy manner and is to be able to be produced in a cost-efficient manner.

This object is achieved in that in the case of a drive train of a hydraulic drive having a hydraulic machine which is movable into operative connection with a consumer by means of a coupling, the housing of the coupling is constructed from a first part which is fixedly connected in an axial manner to the hydraulic machine, and a second part which is fixedly connected in an axial manner to the consumer. The term consumer, in this case, also includes within the framework of the invention a step-up transmission or a step-down transmission which can be arranged between the coupling and the actual consumer, such as, for example, an axle drive or an auxiliary drive.

The two parts of the coupling housing are arranged so as to be displaceable in the axial direction in relation to each other, such that the hydraulic machine and the second part of the coupling housing of the coupling are mounted so as to be axially displaceable in relation to each other. In this case, either the hydraulic machine, to which the first part of the coupling housing is secured, is axially displaceable and the consumer is axially fixed or the consumer, with the second part of the coupling housing mounted thereon, is axially displaceable with the hydraulic machine at the same time being fixed. To the expert, the simultaneous axial displaceability of the two assemblies is also included in the object of the invention, as long as the hydraulic machine can be engaged in or disengaged from the drive train by means of the relative axial displacement of the two assemblies or of the coupling housing parts.

If the consumer, which, depending on the hydraulic machine used, can be a power consumer or a power provider, is provided with a transmission for stepping-down or stepping-up the speed required or supplied by the hydraulic machine, the second part of the coupling housing is preferably connected to the part of the consumer associated with the transmission. According to the invention, the input shaft of the transmission accordingly bears the friction surface of the coupling for transmitting the torques.

For transmitting the drive forces, a first friction surface is provided on the driving/driven shaft of the hydraulic machine. The driving/driven shaft of the consumer is provided with a friction surface which is complementary to the first friction surface of the driven shaft. In this case, the two parts of the coupling housing, and consequently the assemblies of the hydraulic drive train connected thereto, are movable in relation to each other under the influence of a hydraulic fluid in such a manner that the first friction surface and the second friction surface move in relation to each other so that they move into or out of engagement.

By means of the invention, a drive train for a hydraulic drive is provided which allows a hydraulic machine under load to connect or disconnect by means of a coupling without it being necessary to synchronize the speed. In addition, selector forks, disks, rotary transmission read-through and expensive control measures can be omitted.

The expensive control or coordination between the speed and the displacement of the hydraulic machine necessary in the case of synchronous couplings to achieve the required torque that is to be output or taken-up by the hydraulic machine, is avoided according to the invention, for example, by developing a cone coupling as a friction coupling. Simultaneously acting on the hydraulic machine and the actuating mechanism of the coupling with the same hydraulic pressure brings about a relative movement of the two coupling housing parts and consequently an approaching or distancing of the two friction surfaces, wherein restoring forces are applied preferably by resilient components, such as springs.

Acting on the hydraulic machine and the actuating mechanism of the coupling with the same hydraulic pressure causes the transmittable torque on the friction coupling to be controlled automatically without any need for an expensive regulating device or control unit. The higher the torque to be transmitted is to be, the greater the contact pressure on the two friction surfaces has to be, irrespective of the speeds of the motor and consumer or transmission.

The advantages that are achieved for the engagement operation can also be transferred analogously to the disengagement operation. Thus, for example, a hydro-motor, if its driving power is temporarily not necessary, is able to be separated simply and rapidly from the consumer at any speed simply by the supply of hydraulic fluid to the hydraulic machine and/or to the coupling actuating mechanism being reduced or interrupted. By means of, for example, resilient restoring forces, the coupling, i.e. the friction surfaces, is pressed apart, to the extent at which the hydraulic pressure, which is acting on the hydraulic machine, is withdrawn. Further measures such as, for example, controlling the speed of the hydraulic machine or the time sequence of the engagement or disengagement or reducing the displacement prior to reducing the supply of hydraulic fluid are not necessary. The hydraulic machine removed from the drive does not have to be reset to "zero" if it is separated from the supply of hydraulic agent, for example if it is separated by means of valves from the drive train, as no more hydraulic fluid flows through the hydraulic machine. The separation of a hydraulic machine from the supply of hydraulic agent can take place earlier according to the invention as there is no need to wait for a disengagement operation, as known in the prior art. The mechanical separation of the hydraulic machine from the drive train is effected by removing the contact forces on the friction linings, the opening of the coupling preferably being accomplished by means of spring forces. Opening the coupling by means of pressurizing a pressure chamber is also conceivable here and can be carried out within the spirit of the invention.

These advantages, among others, are achieved, for example, by the hydraulic machine or the consumer itself running through the switching path, i.e. the coupling path or the displacement path of the coupling, as one unit is connected to the displaceable part of the coupling housing and the other unit to the other axially fixed part of the coupling. On its driving/driven shaft, the hydraulic machine bears as a friction surface, for example, a cone, which provides a first part of the torque-transmitting friction surface and which, as a result, is displaceable together with the first part of the coupling housing and together with the hydraulic machine in the axial direction in relation to a second part of the coupling housing. The term "axial direction" here and below always refers to the direction which is predetermined by the axes of the hydraulic machine and of the transmission or consumer. The non-displaceable part of the coupling housing is fixedly connected, for example, to the consumer or transmission housing. The drive shaft of the transmission or consumer, which is arranged in a co-linear manner with the drive shaft of the motor, bears the other second torque-transmitting friction surface, for example in the form of a cone that is complementary to the first-mentioned cone.

Even if the invention is described below in an exemplary manner by way of cones as preferred friction surfaces, all other designs of friction surfaces known to the expert are included by the object of the invention.

The cones used as an example are realized in a preferred manner in the form of a flange which is arranged on the associated shaft. In this case, it is additionally possible to develop the flange as part of a separate component which can be placed onto the respective shaft and which is non-rotationally connected to the shaft. In this case, the flange or the friction surface arranged thereon can be fixed axially on the driving/driven shaft of the hydraulic machine or of the consumer as long as the axial relative movement of the two friction surfaces with respect to each other necessary for actuating the coupling is ensured. This can take place, for example, by means of an axial displaceable bearing arrangement of the hydraulic machine or of the consumer or of the transmission connected to the hydraulic machine or the consumer. However, axial displaceability of the respective driving/driven shaft with the shaft being correspondingly guided through the respective housing is also just as realizable, as is axial displaceability of a flange with a friction surface arranged thereon mounted on the driving/driven shaft.

If the coupling path is accomplished by means of the axial displaceability of one or of both of the participating driving/driven shafts or flanges, an axially displaceable arrangement of the associated assembly (hydraulic machine, consumer or transmission) can be omitted.

One of the two cones used as an example is realized here according to the invention as an inner cone and the other as an outer cone, in such a manner that the outer contour of the outer cone corresponds to the inner contour of the inner cone. The surface areas of the cones, in this case, form the friction surfaces of the coupling. The two cones can be fitted into each other for the purposes of the coupling such that the complementary friction surfaces make contact and are able to transmit a torque.

By displacing the movable part of the coupling housing with the assembly rigidly connected thereto in the axial direction or by displacing the driving shaft or the axially movable but radially fixed flange on said shaft by means of the coupling housing, the two coupling surfaces can be moved into engagement or out of engagement, which corresponds to coupling engagement or coupling disengagement.

The coupling engagement or coupling disengagement operation can take place under load. It is effected by the hydraulic fluid preferably being introduced into or removed from a pressure chamber of the coupling housing at operating pressure. The hydraulic fluid operates, for example in the case of a coupling engagement operation, in opposition to a resetting force which is generated by springs and which, in the pressure-free state of the coupling, displaces the two parts of the coupling housing in such a manner that, for example, the two cones of the coupling are spaced apart from each other. The coupling is disengaged into this state. If the pressure chamber is acted upon with hydraulic fluid at the operating pressure of the drive train, in the pressure chamber a force acts in the axial direction onto the displaceable part of the coupling housing. As the pressure rises, the spring forces are overcome, which leads to an axial displacement of the movable part of the coupling housing. This results in the volume of the pressure chamber being enlarged. When the pressure in the pressure chamber is sufficiently high, the complementary cones make frictional contact, which corresponds to the coupling engagement. In this case, the movable part of the coupling housing moves, where applicable, the hydraulic machine, the consumer, the transmission or the respective driving/driven shafts or the flanges arranged thereon, depending on the embodiment of the present invention. It is also obvious that the restoring forces, applied as an example by springs, can also be applied by other means, e.g. by means of a pressure chamber which operates in the opposite direction and which, for example, can also be acted upon with operating pressure in a valve-controlled manner.

The displacement path for actuating the coupling, in this case, only needs to be large enough so that the two friction surfaces, arranged for example on cones, move out of engagement or enable torque transmission. The displacement path is predetermined structurally, for example, by step-shaped radius changes being provided in the first and in the second part of the preferably rotationally symmetrical coupling housing, the end faces of said radius changes defining the pressure chamber in the axial direction. When the pressure chamber is pressure-free, stop members prevent the two parts of the coupling housing from being displaced further, which would mean that the coupling had opened excessively.

The coupling housing can be developed in a preferred manner such that the first part is provided with a coupling piston which is realized as a step and which is sealed off in relation to the second part of the coupling housing and is mounted so as to be concentrically displaceable, the piston having a greater diameter than the adjoining region of the first part. The difference in diameter, in this case, produces the desired step. At the same time said step forms a lateral boundary of the ring-shaped pressure chamber of the coupling. In this case, every development of the pressure chamber familiar to the expert for achieving an axial displacement and generating axial contact forces is suitable. In this case, several individual radially arranged pressure chambers can also be used instead of one radially circulating pressure chamber.

As already indicated above, the restoring forces of the coupling are generated by means of spring forces to open the coupling, for example, here too a development of corresponding pressure chambers familiar to the expert being included by the invention. These pressure chambers are also preferably supplied with hydraulic fluid in a valve-controlled manner from the operating circuit of the drive train.

A displacement of the movable part of the coupling housing in the direction of the other part of the coupling housing under the influence of hydraulic fluid flowing into the pressure chamber leads to contact between the complementary cones of the coupling, which defines the displacement path in this direction.

It is obvious that the supply of hydraulic fluid to the hydraulic machine and possibly also to the coupling has to take place by means of lines, which allow movement at least to the order of magnitude of the switching path of the coupling. In this case, the coupling is preferably supplied with the operating pressure of the hydraulic machine, both the supply of hydraulic fluid to the hydraulic machine and to the coupling being effected by means of suitable valves in an almost isochronous manner and at identical pressure. This means the disadvantages that occur in the prior art of expensive control for the coupling engagement operation in conjunction with the force transmission are avoided. According to the invention, the hydraulic pressure prevailing in the pressure chamber of the coupling is identical to that in the hydraulic machine, which can be accomplished by means of simple directional control valves, for example to avoid hydraulic short circuits.

The contact force achieved in the engaged state between the, for example, conical friction surfaces of the coupling follows the pressure in the pressure chamber, which preferably corresponds to the operating pressure of the hydraulic machine which is to be coupled. The necessary inflow of hydraulic fluid is preferably branched off the hydraulic fluid line of the hydraulic machine. The achievement here is that the contact force rises as the load on the hydraulic machine increases, which prevents the coupling slipping through. This means that a secure transmission of even high torques is ensured and wear is reduced.

It is obvious that hydraulic and electro-mechanical components and control elements, such as supply lines, seals, switchable valves and/or actuating elements, are necessary for actuating the coupling. These are familiar to the expert and are consequently not explained any further here.

Axial guiding of parts of the coupling that are movable towards each other can be achieved, for example, by several guide pins being provided between the parts of the coupling housing, said guide pins extending in the axial direction and being able to be acted upon by compression springs. The guide pins, in a preferred embodiment, are screw-connected to the first part of the coupling housing and/or of the hydraulic machine and prevent the coupling parts rotating towards each other. Their outwardly protruding ends are received in an advantageous manner in bores in the second part of the coupling housing, said bores, for example, also including pressure-exerting springs.

BRIEF DESCRIPTION OF THE DRAWINGS

Two basic exemplary embodiments of the invention are described below as an example by way of FIGS. 1 to 3, in which, in detail:

FIG. 3 shows a cutout of a second exemplary embodiment of a drive train according to the invention.

DETAILED DESCRIPTION OF THE PREFERRED EMBODIMENT

The embodiments described below are shown in an exemplary manner as connectable hydraulic units by way of a hydraulic motor, but are also applicable in an analogous manner to connectable hydraulic pumps, it being possible to realize both types of hydraulic machines as fixed displacement units or variable displacement units, the direction of rotation of which is reversible. In this case, hydraulic units which can act both as pump and as motor are also included.

Figure 1:
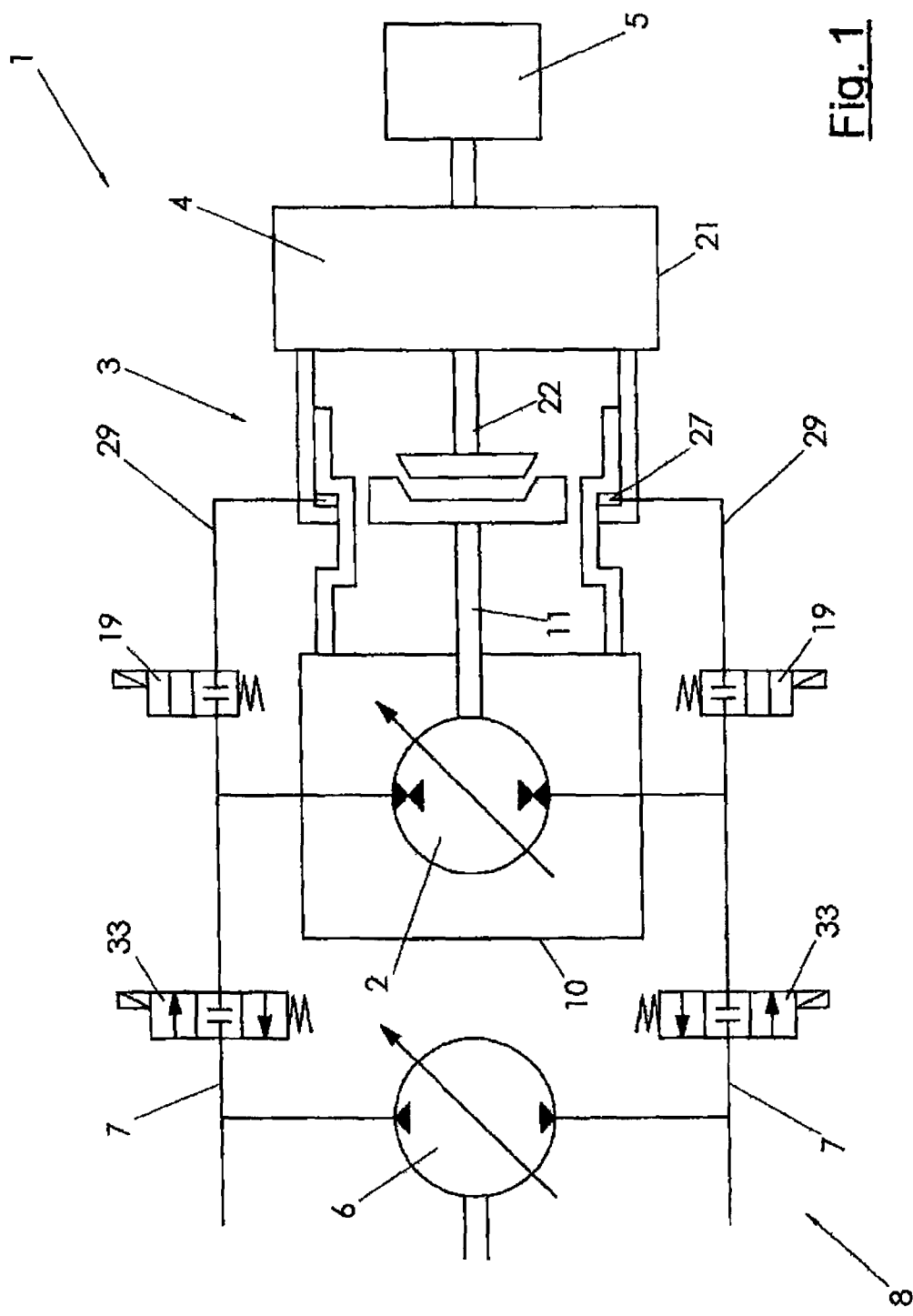
FIG. 1 shows a schematic representation of a drive train according to the invention.

FIG. 1 is a strongly schematic representation of a drive train 1 according to the invention which is part of a drive system of an operating machine with a hydraulic drive. The drive train includes, for example, a motor 2 which is preferably realized as a variable displacement hydro-motor and which is supplied with hydraulic fluid (hydraulic oil) by a variable displacement pump 6. The variable displacement pump 6 is, for example, driven by an internal combustion machine (not shown) and supplies a flow of hydraulic fluid in the pressure lines 7 at a predeterminable operating pressure, said flow circulating in a circuit 8 between the variable displacement pump 6 and one or more consumers, such as the motor 2 or an operating device. The motor 2 is movable into operative connection with a consumer 5 via the coupling 3 and a transmission 4 such that, with the coupling 3 closed, the driving power of the motor 2 is available to the consumer 5. The consumer 5 can be a travelling drive or an auxiliary drive (not shown), for example.

The transmission 4 is to be seen here and below always as part of the consumer 5, as this represents the preferred embodiment. However, it is obvious that a transmission 4 is not absolutely necessary and that the actual consumer can be connected directly to the coupling 3. In addition, consumer housing 21 could always be read in place of transmission housing 21.

Figure 2:
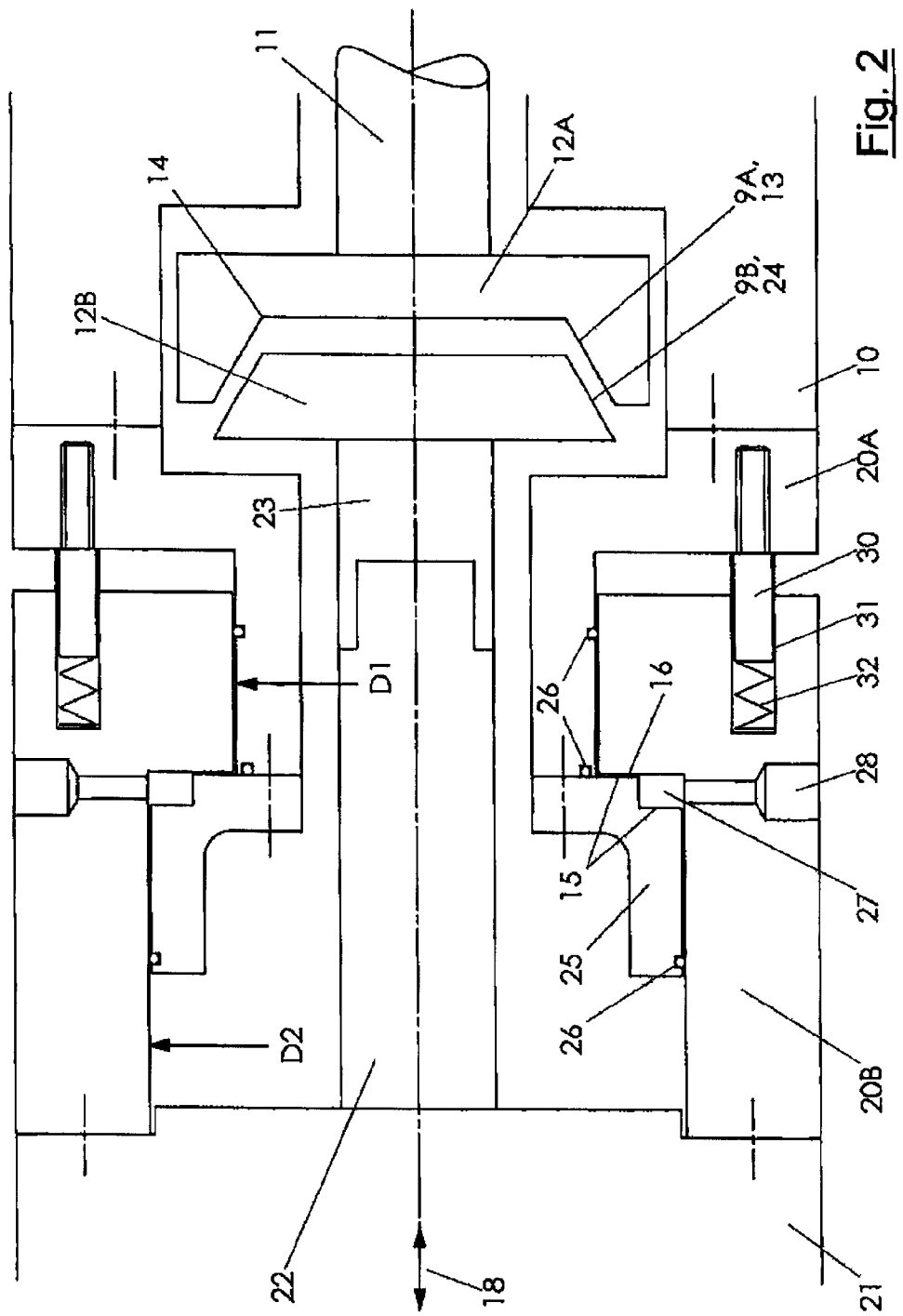
FIG. 2 shows a cutout of a first exemplary embodiment of a drive train according to the invention.

FIG. 2 shows a partially schematized representation of a part view of a drive train according to the invention. The motor 2 has a sturdy motor housing 10 and a driven shaft 11. The driven shaft 11 is provided with a flange 12A, which, according to the invention, bears the cone 9A, which is realized here as inner cone 13. The cone 9A is connected to the driven shaft 11 so as to be non-rotatable and so as to be non-displaceable in the axial direction 18. The cone 9A has a cone angle 14 referring to the axial direction 18 predetermined by the driven shaft 11 of the motor 2.

The coupling 3 has a coupling housing 20 which is realized in two parts. The first part 20A, which is realized substantially rotationally symmetrically, is fixedly connected to the motor housing 10, which is preferably realized by means of a screw connection. The second part 20B, also formed in a rotationally symmetrical manner, is fixedly connected to the transmission housing 21. Both parts 20A and 20B are arranged coaxially and are able to be displaced in relation to each other in the axial direction 18, a part region of the outer surface of the first part 20A being guided slidingly in a part region of the inner surface of the second part 20B. Several seals 26 are present between the first part 20A and the second part 20B, said seals being shown in an exemplary manner as O-rings mounted in grooves, and providing pressure-resistant sealing between the two parts 20A and 20B of the coupling housing 20. A hydraulic fluid feed 28, which can be realized as a bore and which is connected to the hydraulic fluid supply of the hydro-motor 2 via a line 29, opens out into a sealed region formed between the two parts 20A and 20B, the ring-shaped pressure chamber 27.

Several axial guide pins 30 are arranged radially spaced apart from each other between the second part 20B of the coupling housing 20 and the first part 20A and/or the motor housing 10. They are preferably three in number. Said guide pins 30 are fixedly connected by way of one end to the first part 20A of the coupling housing 20 and/or are rigidly connected to the motor housing 10 and are slidingly mounted in the second part 20B of the coupling housing 20 in associated bores 31. They are acted upon with force by springs 32 in such a manner that they press the first part 20A of the coupling housing 20 and the motor housing 10 apart from the second part 20B of the coupling housing 20 in the axial direction 18, in such a manner that the ring-shaped pressure chamber 27 has a minimum volume when there is no fluid pressure present.

The driving shaft 22 of the transmission 4 (not shown in detail) is mounted in the transmission housing 21, to which the second part 20B of the coupling housing 20 is preferably fixedly connected by means of screw connection. The transmission 4, the design of which is not meaningful here, drives the consumer 5 (not shown) by means of a driven shaft (not shown either), as shown in FIG. 1.

On its end projecting out of the transmission housing, the driving shaft 22 of the transmission 4 bears a coupling shaft 23, which, in the exemplary embodiment shown, is placed onto the driving shaft 22 and is non-rotationally fixed thereto. On its end facing the motor 2, the coupling shaft 23 bears a flange 12B, the side face of which is realized as cone 9B, in this case an outer cone 24. The outer cone 24 has the same cone angle 14 as the inner cone 13. The cones 13 and 14 are consequently complementary to each other in such a manner that, when approaching, their surfaces can be moved into positive locking engagement with each other. On contact between the complementary cone surfaces frictional engagement is generated, which depends on the contact pressure and which allows torques to be transmitted.

In an alternative design, the flange 12B with the cone 9B, 24 can also be realized directly on the driving shaft 22 of the transmission 4. Likewise, the cone 9A, 13 on the driven shaft 11 of the motor 2 can also be provided, analogously to the design shown for the transmission side, on a separate coupling shaft, which is non-rotationally connected to the driven shaft 11. It is obvious that the arrangement of outer cone 24 and inner cone 13 can also be exchanged in such a manner that the outer cone lies on the motor side and the inner cone on the transmission side.

In a further alternative embodiment, which is shown in FIG. 3, the driven shaft 11 of the hydro-motor 2, used as an example, is mounted so as to be axially displaceable within the motor housing 10 and the movable first part 20A of the coupling housing 20 moves the flange 9A together with the driving shaft 11 in such a manner that, when there is an increase in pressure or when hydraulic fluid is supplied into the pressure chamber 27, the friction surfaces of the coupling are pressed against each other and transmission of torque is thus possible.

When there is a fall in pressure or the pressure chamber 27 is reduced in size and consequently hydraulic fluid is displaced out of the pressure chamber 27, the first part 20A of the coupling housing 20 is displaced in the direction of the hydraulic motor 2, at the same time the driving/driven shaft 11 being displaced into the housing of the hydraulic machine and the coupling opened.

The exemplary embodiment shown in FIG. 3 can be realized as an alternative with a driving/driven shaft 11 that is fixed with reference to the hydraulic machine, the flange then having to be arranged so as to be axially displaceable, but non-rotational on the shaft. In this case, this also discloses further embodiments to the expert, such as, for example, the kinematically reversed arrangement of the movable and fixed parts as well as other types of fastening or entrainment of the friction surfaces 13, 24 with the movable part or parts 20A/20B of the coupling housing 20.

The method of operation of the drive train 1 is as follows: In the disengaged state, there is no operating pressure of the hydraulic drive at the coupling 3. By means of the guide pins 30, the springs 32 press the two parts 20A and 20B of the coupling housing 20 apart in such a manner that the assemblies respectively connected thereto, motor 2 with motor housing 10 or transmission 4 with transmission housing 21, are spaced apart from each other so far that the two cones 13, 24 are not engaged. This spacing, as shown in the present exemplary embodiment, can be predetermined by the stepped design of the outer contour of the first part 20A or of the inner contour of the second part 20B of the coupling housing 20 and is preferably between 0.5 and 10 mm, especially preferred between 1 and 2 mm. It is defined, for example, by the spacing between the end faces 15, 16 of the respective steps. When the end faces 15, 16 abut against each other, the size of the ring-shaped pressure chamber 27, which is defined laterally by said end faces, is minimal. The pressure chamber 27 is defined radially by the opposite cylindrical walls of the first part 20A and of the second part 20B of the coupling housing 20, which walls have the diameter D1 or D2 as can be seen in FIG. 2.

In the exemplary embodiment of the invention shown in FIG. 1, the step in the first part 20A of the coupling housing 20 is formed by the first part 20A being provided with a coupling piston 25. This coupling piston 25 is screw-connected to the first part 20A of the coupling housing 20 and is sealed off in a pressure-tight manner in relation to said first part and to the inner wall of the second part 20B by means of the aforementioned seals 26. The outside diameter D2 of the coupling piston 25 is greater than the adjacent outside diameter of the first part 20A and greater than the inside diameter of a shoulder 16 realized in the second part 20B, as a result of which the desired step is produced to define the pressure chamber 27 at the side.

As in this operating state the two complementary cones 13 and 24 are spaced apart from each other because they are rigidly connected to the motor 2 or to the transmission 4 and are pressed apart by the action of the springs 32, the coupling 3 is open. The operative connection between the motor 2 and the consumer 5 is interrupted as the two cones 9A, 9B do not make contact and consequently are also unable to transmit any forces or torques.

In the case of the afore-described exemplary operation of the hydraulic drive system, the hydro-motor 2, provided as a representative for hydraulic machines, is at a standstill when its supply of hydraulic fluid is interrupted. The motor 2 can preferably remain in its pivoted-out position when the supply of hydraulic fluid is interrupted, meaning that adjustment times for the motor 2 (or of the hydraulic machine) can be avoided on connection.

If the driving power of the motor 2 is required by the consumer, the motor 2 begins to turn when hydraulic fluid is supplied to the motor and the motor 2 has an operating position with displacement that is not equal to zero. The hydraulic fluid is then also directed by means of the hydraulic fluid feed 28 into the pressure chamber 27 and exerts a force onto the end faces of the steps 15, 16, said force countering the pressure forces of the springs 32. As a result, as the fluid pressure increases in the pressure chamber 27, the first part 20A and the second part 20B of the coupling housing 20 are displaced towards each other in the axial direction 18 in such a manner that the two cones 13 and 24 approach each other and make contact with each other. The contact force between the two cones 13 and 24 follows the respective operating pressure of the hydraulic drive and rises as the hydraulic pressure increases. The transmittable torque depends directly on the pressure. This means that, on the one hand, the coupling is prevented from slipping through, which reduces wear. On the other hand, as early as when the motor 2 is starting up/running up even at low speeds, a torque is able to be transmitted which increases to the preselected required value until the rated speed is obtained.

An expensive and time-consuming coupling engagement operation, where the motor is brought to the required speed initially load-free, the motor is engaged by means of a synchronous coupling, for example, in a drive train and then the required torque is set on the motor by means of adjusting the displacement, is not necessary in this case.

The invention claimed is:

1. Drive train (1) of a hydraulic drive having a connectable hydraulic machine (2) which is movable into operative connection with a consumer (5) by means of a coupling (3), characterized in that
a coupling housing (20) of the coupling (3) is constructed from a first part (20A) which is connected to the hydraulic machine (2), and from a second part (20B) which is connected to the consumer (5), wherein the two parts (20A, 20B) are arranged so as to be displaceable in the axial direction (18) in relation to each other,
a driving/driven shaft (11) of the hydraulic machine (2) pointing to the consumer (5) is provided with a first friction surface (9A, 13),
a driving/driven shaft (22) of the consumer (5) pointing to the hydraulic machine (2) is provided with a second friction surface (9B, 24) which is formed complementarily to the first friction surface (9A, 13), and
the two parts (20A, 20B) of the coupling housing (20) are movable in relation to each other under the influence of a hydraulic fluid in such a manner that, by displacement in the axial direction (18), the first friction surface (9A, 13) or/and the second friction surface (9B, 24) move into or out of engagement with each other; and wherein between the first part (20A) and the second part (20B) of the coupling housing (20) a pressure chamber (27) is formed, into which the hydraulic fluid is directable by means of a feed (28), wherein the two friction surfaces (13, 24) are moved towards each other when the pressure in the hydraulic chamber (27) is raised.

2. Drive train according to claim 1, characterized in that the hydraulic machine (2) is a hydro-motor.

3. Drive train according to claim 1, characterized in that the pressure chamber (27) is exposed to an operating pressure of the hydraulic machine (2) by means of the feed (28) for the hydraulic fluid.

4. Drive train according to claim 1, characterized in that the first part (20A) of the coupling housing (20) is provided with a coupling piston (25), which is mounted in a part region of the second part (20B) of the coupling housing so as to be pressure-tight and axially displaceable.

5. Drive train according to claim 1, characterized in that guide pins (30) with restoring means (32) are present between the first part of the coupling housing and the second part (20B) of the coupling housing (20), said guide pins with restoring means being arranged in the axial direction (18) and opening the coupling when the pressure in the pressure chamber falls.

6. Drive train according to claim 1, characterized in that the second part (20B) of the coupling housing (20) is rigidly connected to a housing (21) of the consumer (5).

7. Drive train according to claim 1, characterized in that the first friction surface (9A, 13) and the second friction surface (9B, 24) are each realized on a flange (12A, 12B) that is mounted on the associated shaft (11 or 22).

* * * * *